Nov. 24, 1936.    W. NANFELDT    2,061,918
MOLDED BRAKE LINING AND PROCESS FOR MAKING THE SAME
Original Filed Feb. 2, 1931    4 Sheets-Sheet 1
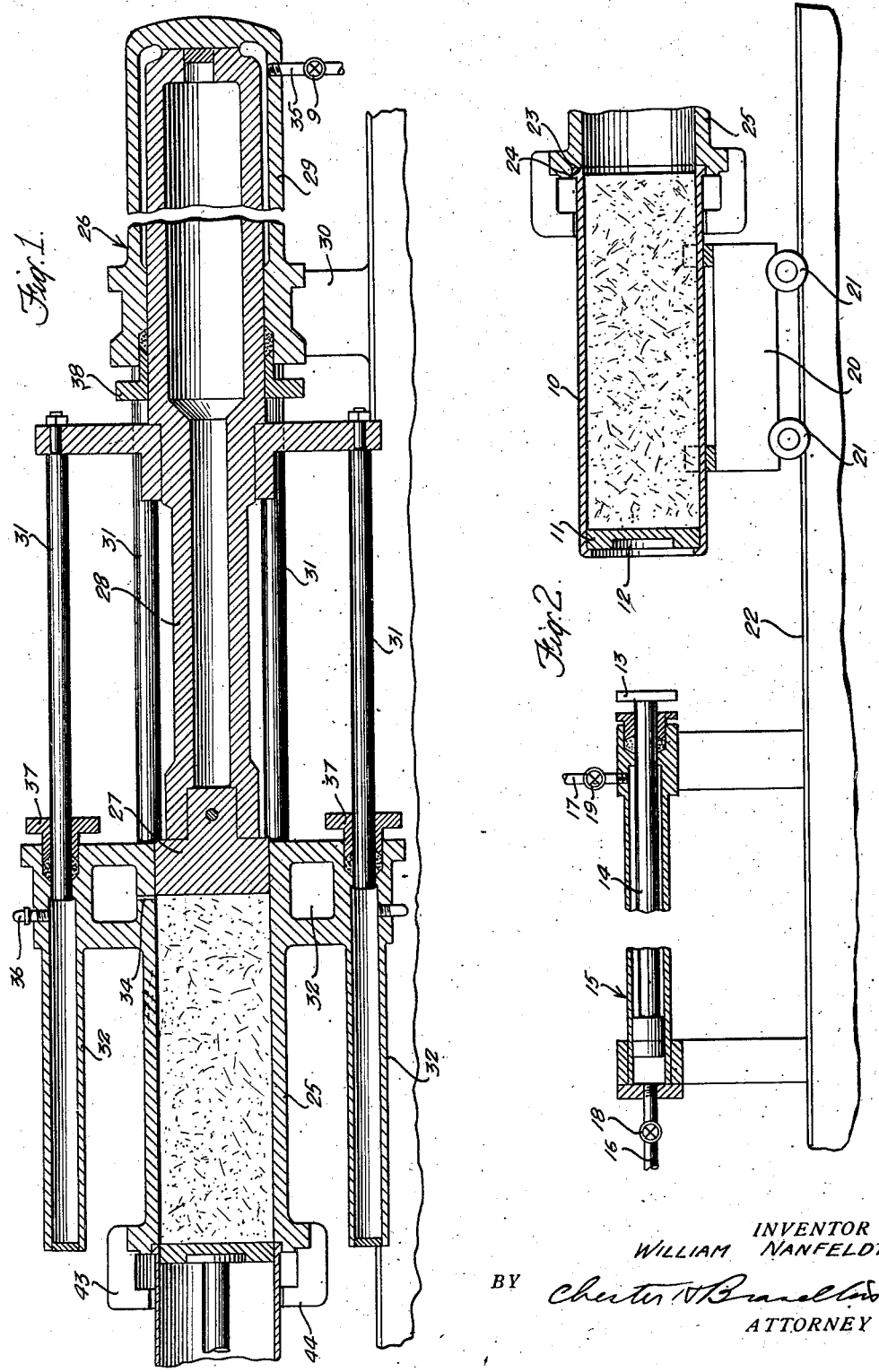
INVENTOR
WILLIAM NANFELDT
BY
ATTORNEY Nov. 24, 1936.   W. NANFELDT   2,061,918
MOLDED BRAKE LINING AND PROCESS FOR MAKING THE SAME
Original Filed Feb. 2, 1931   4 Sheets-Sheet 2
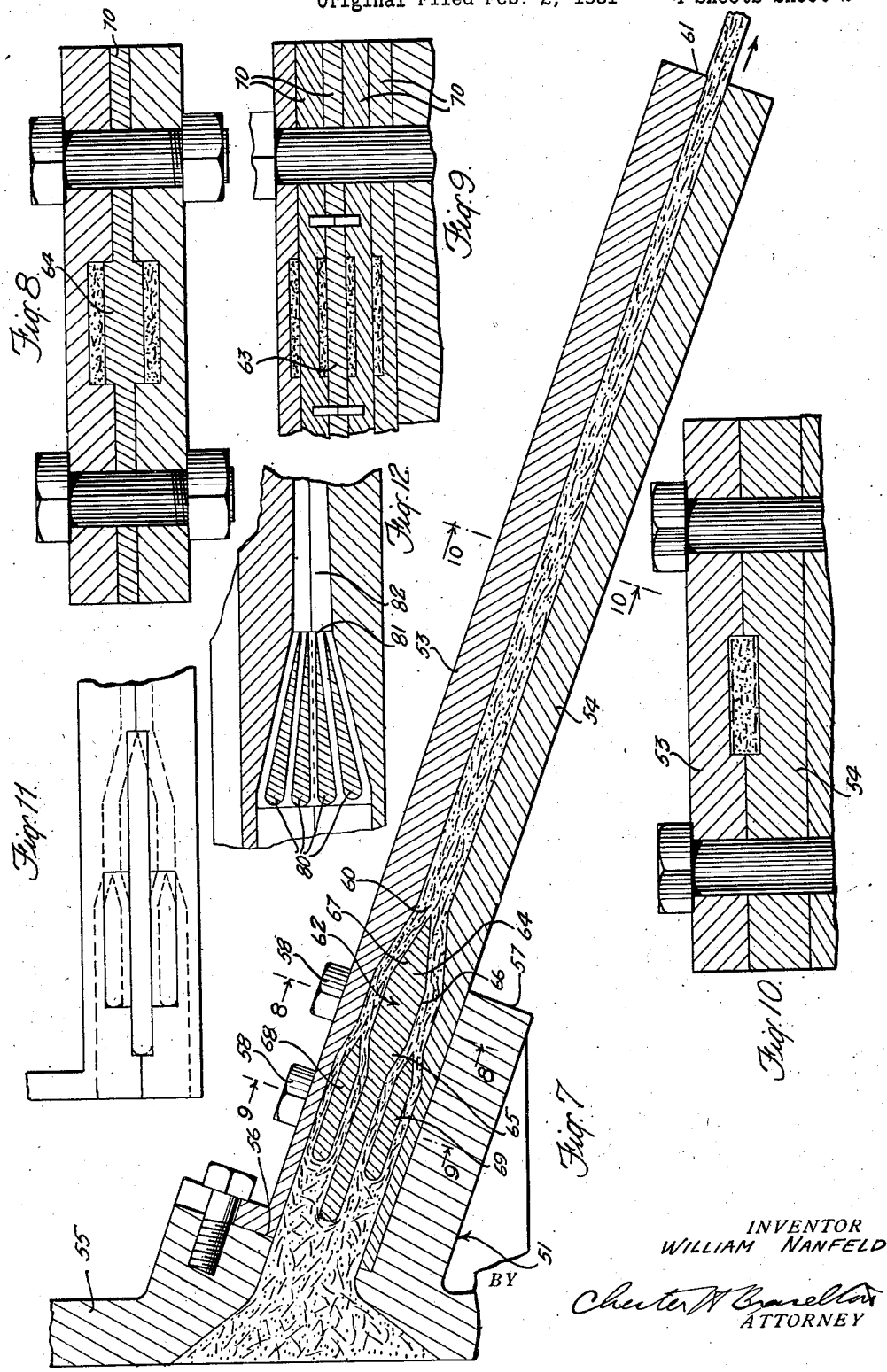
INVENTOR
WILLIAM NANFELDT
BY
Chester N Barcellos
ATTORNEY Nov. 24, 1936.                W. NANFELDT                 2,061,918
            MOLDED BRAKE LINING AND PROCESS FOR MAKING THE SAME
              Original Filed Feb. 2, 1931        4 Sheets-Sheet 3
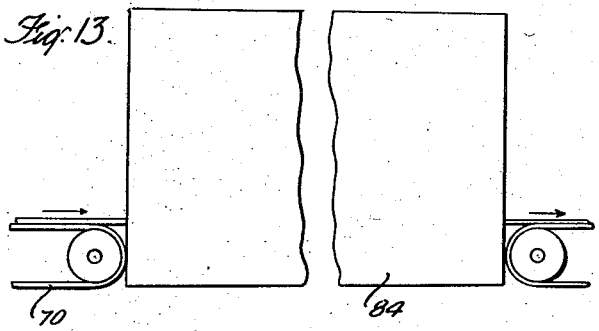
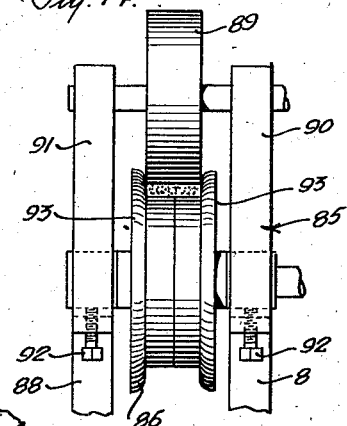
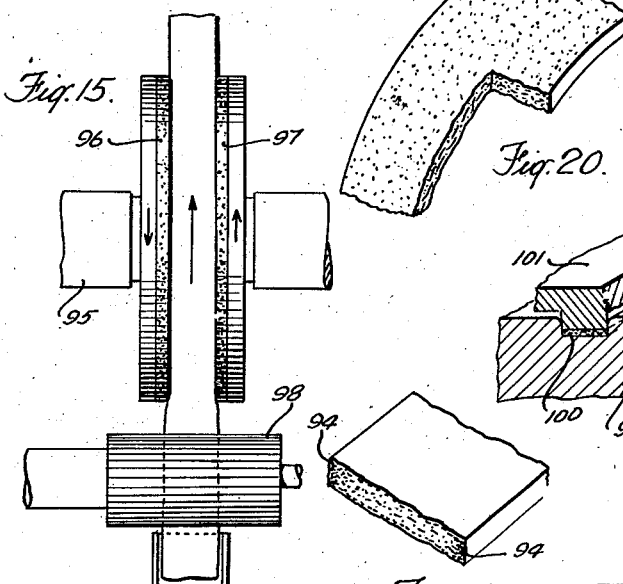
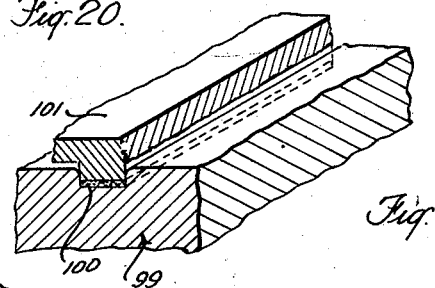
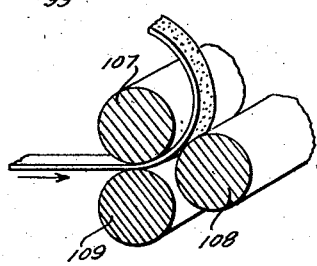
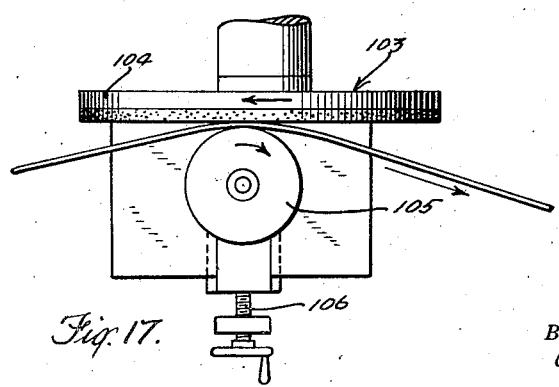
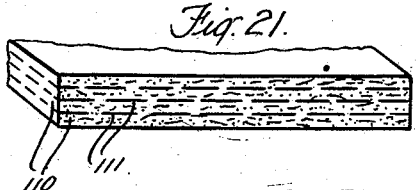
INVENTOR
WILLIAM NANFELDT
BY Chester H Braselton
ATTORNEY Nov. 24, 1936. W. NANFELDT 2,061,918
MOLDED BRAKE LINING AND PROCESS FOR MAKING THE SAME
Original Filed Feb. 2, 1931 4 Sheets-Sheet 4

INVENTOR
WILLIAM NANFELDT
BY
ATTORNEY

Patented Nov. 24, 1936

2,061,918

UNITED STATES PATENT OFFICE 2,061,918

MOLDED BRAKE LINING AND PROCESS FOR MAKING THE SAME

William Nanfeldt, Clifton, N. J., assignor to World Bestos Corporation, Paterson, N. J., a corporation of Delaware Application February 2, 1931, Serial No. 512,892
Renewed April 22, 1936

10 Claims. (Cl. 18—47.5)

This invention relates to molded brake lining and other fibre containing products and process and apparatus for making the same. The invention includes improved means for increasing the flexibility and durability of brake lining without lessening its hardness and durability.

Heretofore, brake lining of the molded type has usually had the disadvantage of being friable and inelastic so that its manufacture necessitated curving the brake lining to fit the brake band of the particular automobile for which the brake band was intended. This necessitated also that the jobber and dealer keep on hand in stock a multiplicity of different sizes and shapes of brake band, requiring a greater outlay of capital and involving various difficulties in handling and distribution.

One of the important objects of the present invention is to provide a molded type of brake lining, which possesses sufficient flexibility to permit shipping in rolls and cutting to fit brake bands of various different curvatures, and which at the same time possesses a high degree of hardness and durability as compared with other standard commercial types of brake lining.

An object also, is to provide a lining which possesses the advantages of laminated structure without having physical separation of the laminations.

Another object is to provide a brake lining which will not fracture normally through its complete mass, but will fracture in sections of the thickness. Still another object is to provide a brake band lining containing asbestos fibre and rubber in which the asbestos fibre is generally parallel to the plane of the surface strip and in layers through the strip.

Another object of the invention is to provide a process of making brake lining which is particularly adapted for compositions containing asbestos fibre. Another object of the invention is to provide a new type of extruder, which automatically divides the fibrous content of the stock entering into the brake lining into a plurality of layers and recombines said layers to form a unitary brake lining strip.

Other objects of the invention are to provide an improved means for preventing the formation of blow holes when placed in the extruder; to prevent a concave surface forming on the brake band strip; to increase flexibility by grinding operations, and accomplish other improvements relating to the invention as a whole and to the details of the process and apparatus, such as will appear on consideration of the following description and the accompanying drawings, in which:

Fig. 1 is a section through a portion of the extruder machine, showing the hydraulic press and the moldable stock in position in the press chamber;

Fig. 2 is a view of the traveling mechanism and hydraulic means employed for charging the main hydraulic press chamber shown in Fig. 1;

Fig. 7 is a sectional view through the extruder nozzle, showing the brake lining stock in the nozzle;

Fig. 8 is a section of the nozzle taken on the line 8—8 of Fig. 7;

Fig. 9 is a sectional view taken on the lines 9—9 of Fig. 7;

Fig. 10 is a sectional view taken on the line 10—10 of Fig. 7;

Fig. 11 is a side view of the dividing plates in the nozzle showing the nozzle cavities in dotted outline;

Fig. 12 is a section through a portion of a modified type of nozzle;

Fig. 13 is a view of a drying oven for drying the brake lining strip;

Fig. 14 is a view of calendering or forming rolls;

Fig. 15 is a view of an edge grinding machine;

Fig. 16 is a detail of a stationary press;

Fig. 17 is a detail of a face grinding machine;

Fig. 18 shows a device for increasing the flexibility of the strip;

Fig. 19 is a view of a section of the strip prior to the edge grinding step of Fig. 15;

Fig. 20 is a view of a portion of the completed brake lining; and

Fig. 21 is another view of the completed brake lining, showing the levelled asbestos fibres, and indicating as by dotted lines the separation of the asbestos fibres into a plurality of layers.

Figure 3:
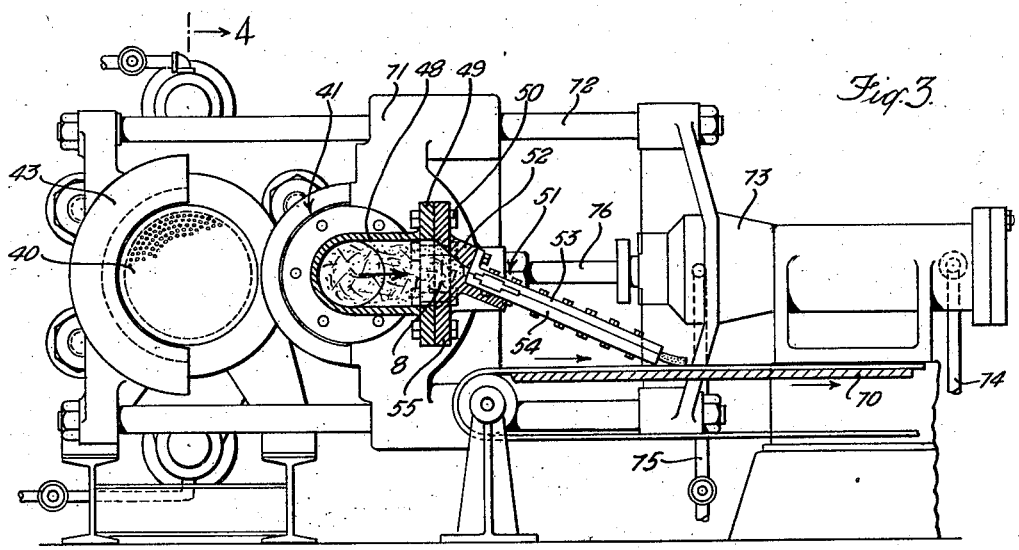
Fig. 3 is another view of the extruder mechanism, showing the extruder nozzle.

As hereinabove stated, this invention has particular utility when employed in the formation of products such as frictional brake lining which contain fibre such as asbestos. In my copending application, Serial No. 429,922, filed February 20, 1930, I have described compositions containing rubber and asbestos, which may be molded into satisfactory brake lining. As stated in this application, I prefer to use the following ingredients in the percentage ranges by weight of the completed composition as follows:

| | Percent |
|---|---|
| Asbestos | 30 to 60 |
| Rubber | 10 to 20 |
| Sulphur | 5 to 10 |

I also utilize in conjunction with the above ingredients, the following materials in varying proportions:

| | Percent |
|---|---|
| Graphite | 1 to 6 |
| Litharge | 1 to 10 |
| Iron oxide | 1 to 5 |
| Kaolin | 1 to 25 |

A satisfactory composition contains percentages by weight of the completed composition as follows:

| | Percent |
|---|---|
| Asbestos fibre | 45 |
| Rubber | 18 |
| Sulphur | 9 |
| Magnesium oxide | 3.6 |
| Graphite | 6 |
| Litharge | 6 |
| Iron oxide | 3 |
| Kaolin | 9.1 |

The composition containing these ingredients is prepared according to the process described in the copending application mentioned.

According to this method, crude smoked rubber sheets are macerated between oppositely traveling rolls in a roll mill, and simultaneously combined with certain cure accelerators, such as magnesium oxide (MgO) and litharge in the proportions hereinabove mentioned. Sulphur is also added to bring about vulcanization in a later step in the process.

The macerated rubber is then placed in thin sheet form, the sheets having a thickness preferably less than one-thirty second of an inch, four or five thousandths being as satisfactory. This sheet of rubber mixture is then placed in a masticator or mixing machine of the impact type having rotating blades or impact members which constantly carry around and agitate the contents of the material. To the rubber is added a rubber solvent, such as gasoline, benzol, solvent naphtha, etc., the weight of the solvent being approximately that of the batch of material.

The rubber and solvent are mixed for approximately half an hour, or until the rubber becomes a cement, and asbestos fibre in the proportions above stated is then added and mixing continued until individual fibres of the asbestos are coated with the cement. This step is important as the rubber acts as a protective coating for the asbestos. After about half an hour when the asbestos has been thoroughly coated, rubber latex is added in amounts varying from 1% to 75% of the predetermined quantity of rubber to be used in the completed composition. The latex is mixed with the coated asbestos until it is absorbed in the mixture. Then the final cure, lubrication, and filler elements are added such as iron oxide ($Fe_2O_3$), graphite, and kaolin, and these elements thoroughly stirred and mixed into the batch until a homogeneous mixture is obtained.

The mix is now transferred to a second roll mill which may have one roller corrugated and which serves to further macerate and rend the material, and also to crush all small masses or balls of the mixed material so that a smooth, uniform and homogenous stock is finally obtained suitable for insertion in the extruder or for any other purpose for which a moldable composition may be used.

In utilizing the composition which was briefly described hereinabove for brake lining, the material is placed in a receptacle, such as a cylinder 10, shown in Fig. 2 of the drawings. This receptacle has a movable base 11 provided with a recess 12 which is adapted to receive the head 13 on the plunger 14 of a hydraulic press 15. This press has appropriate inlet and outlet conduits or pipes 16 and 17, controlled by valves 18 and 19 respectively. The container 10 is placed on its side on the small truck or conveyor 20 having wheels 21, adapted to ride on the rails 22, and the container moved so that the rim 23 of its top or open end is inserted in an annular depression 24, formed about the periphery of the main press chamber 25 of the hydraulic press unit 26.

The hydraulic press unit 26 includes in the chamber 25, a plunger head 27 movable therein, plunger head stem 28 attached to the head 27, and movable within the supporting cylinder 29 mounted on the standard 30. The unit also includes the slide rods 31 which are movable within the cylinders 32 and which serve to provide means for moving the head 27 as well as add rigidity to the press structure. A chamber 33 is formed circumferentially about the end of the press chamber adjacent the stem 28, this chamber having connection by the duct 34 to the press chamber, for the purpose of permitting exit of air which may be trapped in the chamber when the charge of stock is originally placed therein. This exit permits the charge press piston 14 to function without the formation of air holes in the stock during the insertion thereof.

The support cylinder 29 has an inner diameter somewhat greater than that of the stem 28, allowing a certain amount of space for admission of air through the conduit 35, as controlled by valve 9, in order to force the press head 27 against the stock within the press. The outward movement of the press head 27 is brought about by introduction of fluid into the cylinders 32 through the conduits 36, whereby the slide rods 31 are forced outwardly. Appropriate packing rings 37 and 38 are provided for the rods 31 and piston 28.

When the stock is positioned in the press chamber 25, as illustrated in Fig. 1, the container 10 with its base 11 are removed, and the screen plate 40 substituted. This plate 40 has a diameter such that it fits into the annular depression 24 about the periphery of the outer opening of the press chamber 25. The base cap 41 is then slid into position back of said screen. This cap 41 consists of a circular ring 42, which possesses a transverse conical opening 39, the inner base diameter of the cone being less than the diameter of the screen 40. The ledge formed by the ring at the base of the cone, is adapted to rest accordingly on the outer edge of the screen 40 when the cap is in position, and also to be engaged by the half circular section 43 rigidly attached to the open end of the press chamber 25. As clearly illustrated in Figs. 1, 3, and 4, the member 43 has an internal channel, the outer face 44 of which having a diameter greater than that of the stock container 10. By this means the ring 42 may be clearly positioned back of the screen 40 and be maintained in position against the high pressure of the hydraulic press.

Figure 4:
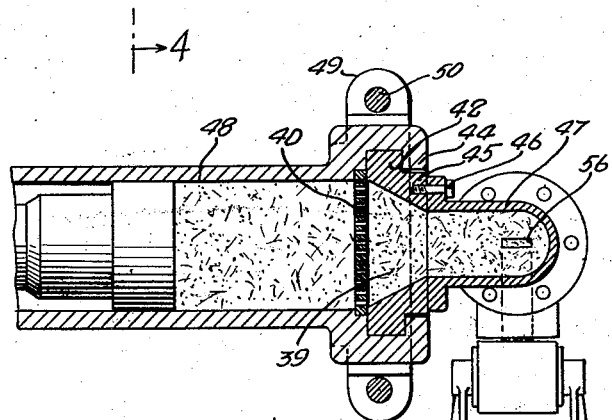
Fig. 4 is still another view of the extruder mechanism.

The outer face of the ring 42 is continued in an annular projecting member 45 having an outer diameter less than that of the ring 42, a portion of the outer surface of this member lying adjacent the inner surface of the inwardly projecting flange 44. The conical aperture 39 in the ring 42, is extended through the auxiliary ring 45 and terminates at the outer surface of this ring member. Attached to the member 45 as by bolts 46, is an L-shaped conduit 47, the diameter of the opening adjacent the conical aperture of the member 45 having approximately the same diameter as the outer diameter of the cone 39. As illustrated in Fig. 3, the conduit 47 has an arm 48 which is approximately parallel to the base of the extruding unit and which terminates in the attaching flange 49 to which the nozzle of the extruder is adapted to be fastened by any appropriate means, such as the bolts 50.

The extruder nozzle indicated, generally as 51, includes the member 52 which is bolted to the flange 49 and the members 53 and 54, the latter forming two halves with facing channels which when bolted together form the main passageway of the nozzle. The member 52 is formed with the flange 55, to engage the flange 49 of the L-shaped conduit 48, and possesses a conical interior 8, the base of the cone coinciding with the outer end of the conduit 48. The inner end of the cone is altered in shape to form a flat and widened aperture such as illustrated at 56 in Fig. 5. The lower side of this aperture is extended as a lip 57, which serves as a supporting means for the main nozzle units 53 and 54, which are fastened thereto as by bolts 58.

As stated, the main nozzle consists of two channel members 53 and 54, which are fastened together so that the channels are superimposed, forming a rectangular channel. From the point 60 to the end 61 of the nozzle channel, there is a slight taper in the four walls of the rectangle, amounting to about one-hundredth of an inch, so that the material passing from the point 61 is slightly compressed. From the point 56 to the point 60 the nozzle cavity is enlarged and a plurality of partitions are interposed in the passageway. These partitions consist of the central plate 62 and two auxiliary plates 68 and 69 extending transversely across the nozzle as shown clearly in Figs. 7, 8, 9 and 10. The plate 62 has a uniform thickness for approximately one-half its length as indicated by the numeral 63, and for the remainder of its length it is enlarged to a configuration somewhat similar to a spear head and bearing the numeral 64, this portion of the plate having diverging side surfaces 65, parallel surfaces 66, and converging surfaces 67, the surfaces 67 coming to an edge in the direction of the normal movement of the stock. The end of the plate adjacent the aperture opening 56 is rounded as indicated in Fig. 7.

Intermediate the flattened portion 65 of the barrier plate 62 and the adjacent side walls of the nozzle, are interposed the two additional partition plates 68 and 69, of approximately one-half the length of the plate 62. These plates are approximately equally spaced, each between section 63 of the plate 62 and the adjacent nozzle wall, and are similarly shaped with the edge adjacent the aperture 56 rounded similarly to the rounded edge of the plate 62 and the edges on the sides of the plates in the direction of the flow of material having converging faces forming sharp edges similarly to the forward edge of the main plate 62. To accommodate the interposition of the plate 62 and the auxiliary plates 68 and 69, the walls of the nozzle channel plates are correspondingly thinned so that the cross-sectional areas taken through points of the nozzle at 60 and containing the sections 63 and 64 of the plates 62, are each approximately equal.

As illustrated in Figs. 8 to 11 inclusive, the plates 62, 68 and 69 are maintained in position by reason of lateral extensions 70, which are clamped between the nozzle members 53 and 54 and held therein by means of bolts 58.

As illustrated particularly in Fig. 3, the nozzle 51 inclines at an angle to the horizontal L-shaped conduit 48, its lower end terminating adjacent the surface of a traveling belt 70 on which the extruded material is adapted to flow. The position of the nozzle and the attached cap is varied by movement of a supporting frame 71 along guide rods 72, this movement being brought about by means of a hydraulic or other fluid pressure operating member 73, having an inlet conduit 74 and an outlet conduit 75, and operating on the shaft 76 connected to the plate 71.

In the operation of the extruder when the stock is positioned in the press chamber 25 and the screen 40 and cap 41 positioned in place over the open end of the press chamber 25, fluid is introduced through the conduit 35 into the guide cylinder 29 which causes movement of the press head 27 against the stock, forcing the same through the screen 40 and into the nozzle. The screen 40 by virtue of its multiplicity of parallel apertures, causes the breaking up of balls and lumps of asbestos fibre, and serves to separate the fibrous material. The stock, after it passes the screen 40, enters the L-shaped member 47, and in so doing is compressed by the conical shape of the mouth of said chamber. The material is further compressed by the converging walls 8 of the nozzle member 52, the material then entering the aperture 56 which has a cross-sectional area between 200% and 300% oversize of the finished brake lining strip, although conforming in its general outlines to said finished strip.

The material then passes between the partition plates 68 and 69 and the section 63 of the plates 62, these forming four passageways for the material. The rounded edges which meet the material, initially prevent conglomeration of fibres and bunching which would tend to clog the nozzle. The stock moves accordingly in four layers until it reaches the ends of the auxiliary dividing plates 68 and 69, and enters the passageways formed between the enlarged section 66 of the plate 62 and the nozzle walls. In this area pairs of adjacent flow streams of material combine in single streams. Beyond the plate section 66, the two streams of material combine as one and thence onwardly the material passes along the slightly converging walls until it reaches the exit 61, after which it is discharged upon the traveling belt 70.

The walls of the nozzle intermediate the points 60 and 61, converge in order that the previously separated layers of material may be thoroughly unified, and the convergence assists in bringing this about. It is thus apparent that while within the nozzle there is a separation of material into four layers, the emerging strip is unitary. There is, however, the important structural result that in passing by the barrier plates, the fibres of asbestos are straightened out in a plane transverse to the strip, and although the layers are recombined, there still exists a group of planes extending transversely through the strip at which the fibres are all practically parallel to the surface of the strip in distinction to the direction of the fibres in planes parallel to the strip which lie in all directions, interlocking with each other.

The size of the strip as it emerges from the nozzle, is approximately 220% oversize to the finished strip, this allowing for necessary drying and finishing operations. It should also be pointed out, that the mass per unit length of the finished strip is determined in the extruder by varying the amount of solvent. By diminishing the amount of gasoline, for example, in the mix as placed in the extruder, the mass per unit length of the finished product is increased. A satisfactory percentage of solvent in the original composition has been found to be approximately 30% by weight of the weight of the solid substance.

Figure 5:
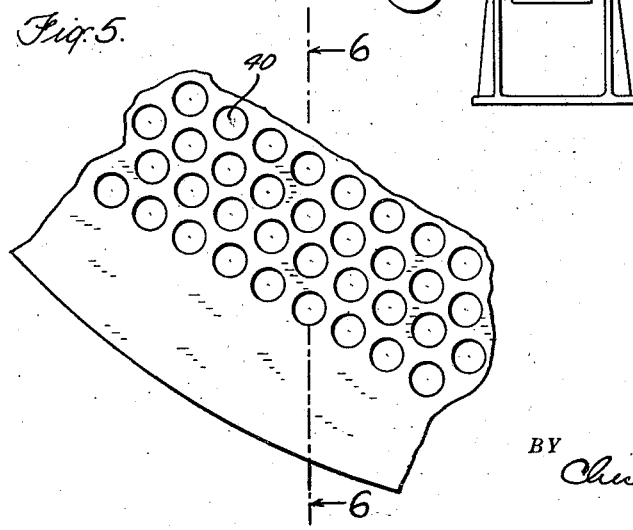
Figs. 5 and 6 are views showing portions of the screening plate.
Figure 6:
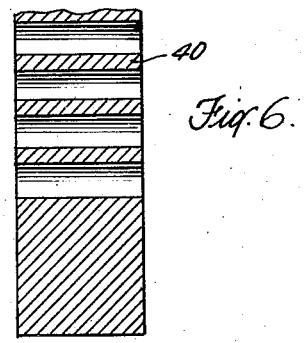

Attention is directed to the extension of the barrier plate 65 in the nozzle to the rear of the rear edges of the auxiliary plates 68 and 69, the purpose of this being to permit an initial division of the traveling stock into two layers prior to its subsequent division into four layers. This arrangement, however, while advantageous for material having pronounced fibrous structure, is not essential, and in Fig. 12 I have illustrated a modification of the barrier plate arrangement in which I utilize four plates of triangular cross-section, the rounded bases 80 of which lie approximately in a single transverse plane. As illustrated, the triangular plates converge with the converging inner wall of the nozzle, the forward edges of these plates terminating in approximately the same transverse plane at the limit of convergence of the inner walls of the nozzle. There is thus provided, as illustrated in Fig. 5, converging paths for the stock, separating the same into five layers for the length of the barrier plates, these layers being subsequently combined in the space 82 of the nozzle. It is, of course, possible to vary the number of layers in which the material is formed in the nozzle indefinitely, but I have found a limited number, such as four or five, to give satisfactory results in brake lining now in actual use.

After leaving the nozzle, the extruded material is carried by the traveling belt 70 to the drying oven 84. This may be of any standard form including an enclosure in which heat is applied so as to cause evaporation of the solvent. An important advantage of the use of latex becomes evident in this drying operation inasmuch as the water content of the latex is disseminated all through the preliminary brake band strip, and in the presence of heat, the expanding water and vapor brings about a porosity which accelerates the drying operation. Where water is not present as is the case where crude rubber alone is used in the preparation of the composition, the surface of the strip when dried, first forms a hard and impervious skin layer which effectively hinders evaporation of the solvent from the interior of the strip, and thus very materially increases the time necessary for removing the solvent. By using rubber latex composition, the drying time is reduced over 50%, the actual reduction being from four to five hours to one to two hours. While the use of an enclosed oven with the application of artificial heat is preferable as hastening the drying operation, it would be feasible to dry the strip in the open air provided the humidity and temperature conditions were suitable.

From the drying oven 84 the strip is conveyed to a calendering or forming roll 85, as illustrated in Fig. 14. This roll is of a type in which two rolls or wheels having flat rims, rotate in the same plane with rims adjacent each other. As illustrated, the wheel 86 is supported on the standards 87 and 88 and is rotated in juxtaposition to the wheel 89 supported on standard 90 and 91 above the wheel 86. Adjustment of the position of the wheel 89 is made through set screws 92. The rim of wheel 86 is U-shaped in cross-section so that when the strip is inserted between the wheels the projecting edges of the rim restrain the strip from lateral movement.

After the rolling operation which perceptibly diminishes the thickness of the strip, the strip is subjected to an edge grinding operation. On reference to Fig. 19, a portion of the strip in this stage of manufacture is illustrated. Attention is called to the corrugated formation of the edges 94, which is brought about through the lessening of the width without removing the stock as resulting from the drying and calendering operations. This causes crinkling or folding of the edges which, if allowed to remain, would produce concave side surfaces and tend to prevent flexible movement of the strip. It is accordingly desirable to remove these edges and, as illustrated in Fig. 15, a grinding machine 95 is employed, having oppositely positioned grinding wheels 96 and 97, the adjacent surfaces of which are covered with abrasive material and which rotate in opposite directions as indicated by the arrows. The strip of brake lining material is fed under the ridged guide roll 98 between the grinding wheels 96 and 97, and the edges thereof removed.

The strip is then subjected to a press and vulcanizing step. While various means may be employed for carrying out this phase of the process, I utilize a flat press 99, consisting of a plurality of spaced grooves or channels adapted to receive predetermined lengths of the strip as it comes from the edge grinder. Pressure plates 101 are applied on the various strips, and pressure of approximately 1500 lbs. per square inch exerted thereon for approximately fifteen minutes and at a temperature of about 325° F., the heat and pressure serving to vulcanize the rubber. There is also formed on these strips a hard surface skin, which makes the material non-flexible, and I have, therefore, found it desirable to remove one face of the molded product as by the grinding machine 103, illustrated in Fig. 17. This machine is simply a rotating grinding wheel 104, having an abrasive surface thereon and a guiding wheel 105, adjustable by the screw shaft 106. The strip moves in a direction as indicated by the arrow and against the rotation of the grinding wheel. By this means also, irregularities in the thickness of the strip may be corrected. I have found that the flexibility of the strip can be increased by subjecting it to a bending operation. In Fig. 18, therefore, I have illustrated three rollers 107, 108 and 109, and the strip having one surface ground is passed between these rollers, as illustrated in the figure, in such a manner that the ground surface contacts with two of the rollers 108 and 109, the third roller 107, pressing upon the band at a point intermediate the points of contact of the band on the other two rollers. This causes a curvilinear flexure of the material, releasing internal stresses of the lining and producing the final strip 112.

The inherent flexibility of the brake band results from its layer construction, which through causing a horizontal positioning of the fibrous stock of the material, tends to permit more readily a lateral movement of the lining. This advantageous characteristic of the completed brake band is brought out in Fig. 21, where the various layers or laminations are indicated by the numeral 110 and as separated by imaginary planes 111. While, of course, there is no separate movement of these individual layers of material in the brake lining, in each layer the fibres are more or less parallel to the surface of the brake band and hence will not tend to restrain a lateral flexing of the band.

Another feature of the invention as brought about by the layer construction, will be apparent on consideration of the fact that lumps or balls of the stock cannot exceed in the finished product the width of an individual layer. Hence, when the band is subjected to a sharp bending movement, there can be no point of weakness in the band induced by the presence of a ball or lump of conglomerated material. Should any small lumps of the material enter into the finished product, a fracture of the band resulting therefrom would extend only to one layer.

Because of the flexibility of the brake band brought about by its layer construction and by its subsequent treatment to edge grinding and surfacing, it is possible for the manufacturer to ship the lining in roll form directly to the jobber or dealer, who may then cut the lining to length and fit it to a brake drum of any make of automobile having diverse curvatures. This is an advantage of highest importance, resulting from the invention.

In addition to the flexibility arising from the laminated construction, the hardness and durability of the lining is augmented. Brinell hardness tests on the lining surface give a reading of eight-thousandths of an inch with a three-quarter inch (¾") slug, using a pressure of 3000 kilograms as compared to twelve to fifteen thousandths for competitive linings.

While I have described a specific process for accomplishing the results mentioned in securing the product, I am aware that various alternatives may be employed in the steps involving the use of different apparatus, but which nevertheless will secure to me the product contemplated. For example, instead of using a stationary vulcanizing press, I may use a traveling vulcanizer and pressure apparatus, such as described in the copending application of C. P. Brockway, Serial No. 505,253. Also, instead of grinding the edges only, as illustrated by the apparatus of Fig. 15, I may grind all four surfaces of the brake lining. In addition, some of the steps mentioned, while desirable, may be eliminated where the use of the product does not require the treatment omitted. Particularly should it be pointed out that the process can be applied to any fibrous stock either vegetable or mineral, including cotton, wool, hemp, shredded leather, etc., although the invention has special utility in the formation of brake band lining from a moldable composition containing asbestos.

Various other modifications of the invention as disclosed may be made, and, therefore, I do not wish to be restricted except as required by the claims hereto appended.

Having thus described my invention, what I desire to claim is:

1. A process for making brake bands out of a moldable composition containing rubber, rubber solvent, sulphur and filler ingredients, which consists in forming the material into separated layers, forcing the layers together into a unitary strip, removing the solvent from said strip, forming the strip roughly to size by the application of transverse pressure thereon, removing the original edges of said strip, curing the strip by the application of heat and pressure in suitable molds, removing one of the flat surfaces of said strip, and finally relieving the internal stresses of the strip by a flexing operation.

2. A process for making brake bands from a composition containing crude rubber, rubber solvent, rubber latex, sulphur and filler ingredients which consists in forming said composition into a plurality of separated layers, combining said layers into a unitary strip by the application of pressure, removing the solvent from said strip, applying transverse pressure to the strip to force it to approximate size, removing the original edges of said strip, curing the moldable material of the strip by the application of heat and pressure, removing one flat surface of said strip and bending said strip in a direction away from said removed surface.

3. A process of making friction brake band lining which consists in macerating crude rubber mixed with cure accelerators, forming said macerated material into thin sheets, masticating said sheets successively with a solvent, asbestos fibre, rubber latex, and fillers, forming said masticated material into a plurality of layers, binding said layers into a unified strip, removing the solvent from said strip, bringing about a set of the strip by the application of pressure and heat, and subjecting the strip to lateral flexing.

4. A process of making friction brake band lining which consists in macerating crude rubber mixed with sulphur and cure accelerators, forming said macerated material into thin sheets, masticating said sheets successively with a solvent, asbestos fibre, rubber latex, and fillers, forming the strip roughly to size, removing the original edges of said strip, curing the strip in the presence of heat and pressure, removing one face of the strip, and subjecting the strip to lateral flexure.

5. A process for making brake bands which consists in making a cement from crude rubber, sulphur, and rubber solvent, coating asbestos fibres with said cement, mixing rubber latex with said cement-coated fibres, forming said mixture into a plurality of separated flat layers, combining said layers in a unitary strip out of contact with the atmosphere and while simultaneously preventing increase in the strip thickness, curing the strip by the application of heat and pressure, and forming the strip to size.

6. A process of making strip lining which consists in macerating crude rubber mixed with sulphur and cure accelerators, masticating said mixture successively with a solvent, fibrous stock, rubber latex, and fillers, forming said masticated material into a plurality of flat layers, combining said layers into a unified strip out of contact with the atmosphere, removing the solvent from said strip, curing said strip and subjecting the strip to lateral flexing.

7. A process of making flexible molded brake lining from moldable stock which comprises mixing together asbestos fibres with bonding, solvent and filler materials, forming the mix into a plurality of flat plastic strips of uniform thickness, uniting these flat strips immediately after formation while under pressure and out of contact with the atmosphere and while simultaneously preventing increase in the strip thickness, removing the solvent, curing the bond, and forming the lining to size.

8. A process of making flexible molded brake lining from moldable stock which comprises mixing together asbestos fibres with bonding, solvent and filler materials, aligning the fibres of asbestos, forming the mix into a plurality of flat plastic strips of uniform thickness, uniting these flat strips immediately after formation while under pressure and out of contact with the atmosphere and while simultaneously preventing increase in the strip thickness, removing the solvent, curing the bond, and forming the lining to size.

9. A step in the process of making flexible molded brake lining from moldable stock containing asbestos fibres, rubber, rubber solvent and curing and filler materials which consists in aligning the fibres of a plastic mixture of the materials, forming the mix into a plurality of flat separated strips of uniform thickness, uniting these flat strips immediately after formation while under pressure and out of contact with the atmosphere and while simultaneously preventing increase in the strip thickness.

10. A process of making flexible molded brake lining from moldable stock which comprises mixing together asbestos fibres, rubber, rubber solvent and filler materials, aligning the fibres of a plastic mass of said mix, dividing the mix into separate flat strips of uniform thickness, uniting these flat strips immediately after formation while under pressure and out of contact with the atmosphere and while simultaneously preventing increase in the strip thickness, grinding the edge surfaces of the lining, curing the lining, and removing a face of the cured lining.

WILLIAM NANFELDT.